United States Patent
Wood et al.

(10) Patent No.: US 7,347,760 B2
(45) Date of Patent: Mar. 25, 2008

(54) INTERACTIVE TOY

(75) Inventors: Michael C. Wood, Orinda, CA (US);
Craig R. Hendrickson, Fremont, CA (US); Kathleen Campisano, Danville, CA (US); Jim Cordova, San Jose, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 764 days.

(21) Appl. No.: 10/336,667

(22) Filed: Jan. 3, 2003

(65) Prior Publication Data
US 2003/0139113 A1    Jul. 24, 2003

Related U.S. Application Data

(60) Provisional application No. 60/346,454, filed on Jan. 5, 2002, provisional application No. 60/346,326, filed on Jan. 5, 2002.

(51) Int. Cl.
*A63H 30/00*    (2006.01)
(52) U.S. Cl. ................ 446/175; 446/408; 434/159
(58) Field of Classification Search ........ 446/147–151, 446/175; 463/9; 434/159
See application file for complete search history.

(56) References Cited

U.S. PATENT DOCUMENTS

| | | | |
|---|---|---|---|
| 4,651,613 A | | 3/1987 | Harrison |
| 4,846,692 A | | 7/1989 | Delcambre |
| 4,968,255 A | * | 11/1990 | Lee et al. ................... 434/159 |
| 5,087,043 A | * | 2/1992 | Billings et al. ......... 273/157 R |
| 5,127,869 A | * | 7/1992 | Hanzawa .................... 446/397 |
| 5,277,588 A | | 1/1994 | Lin |
| 5,290,190 A | * | 3/1994 | McClanahan ............... 434/317 |
| 5,364,272 A | | 11/1994 | Herman et al. |
| 5,372,511 A | * | 12/1994 | Keung ........................ 434/345 |
| 5,803,748 A | * | 9/1998 | Maddrell et al. ........... 434/317 |
| 5,816,886 A | | 10/1998 | Cusolito |
| 5,823,782 A | | 10/1998 | Marcus et al. |
| 6,041,215 A | | 3/2000 | Maddrell et al. |
| 6,059,237 A | | 5/2000 | Choi |
| 6,171,168 B1 | * | 1/2001 | Jessop ....................... 446/297 |
| 6,190,174 B1 | | 2/2001 | Lam |
| 6,353,168 B1 | * | 3/2002 | Sosoka et al. ................ 84/600 |
| 6,464,503 B1 | | 10/2002 | Heit et al. |
| 2003/0016210 A1 | | 1/2003 | Soto et al. |

* cited by examiner

*Primary Examiner*—Robert E. Pezzuto
*Assistant Examiner*—Alex F. R. P. Rada, II
(74) *Attorney, Agent, or Firm*—Townsend and Townsend and Crew, LLP

(57) ABSTRACT

Embodiments of the invention relate to interactive toys. In one embodiment, the interactive toy includes a housing, and a receiving region on the housing. A detection device including a plurality of detectors is in the receiving region. A processor operatively coupled to the detection device. A solid object is received in the receiving region. The toy could be a toy electronic train, or an interactive book.

8 Claims, 14 Drawing Sheets

INTERACTIVE TOY

CROSS-REFERENCES TO RELATED APPLICATIONS

This non-provisional application claims the benefit of the filing dates of U.S. Provisional Application No. 60/346,454, filed Jan. 5, 2002, and U.S. Provisional Application No. 60/346,326, filed Jan. 5, 2002. Both of these provisional patent applications are herein incorporated by reference in their entirety.

BACKGROUND OF THE INVENTION

A number of interactive toys exist. Many of these interactive toys are adapted to teach children skills such as reading, letter recognition, counting and math. Some conventional interactive toys use block-type items to facilitate learning.

One such toy is called Talking Phonics Blocks made by Child Guidance. In the Talking Phonics Blocks toy, a toy block is placed on a talking stage. The toy includes 7 blocks. Each block has six block faces, and a pattern of protrusions throughout one of the block faces. The four block faces that are directly adjacent to the coded face have words and images of objects (e.g., a picture of the sun and the word "sun"). When the coded face is placed on a "talking stage" one of the four adjacent faces is displayed to the child and the toy says something about the image on the face that is being displayed to the child. The talking stage has an array of pressure switches on it and the coded block face will press down on a certain number of the pressure switches depending on which of the adjacent block faces is facing the child.

Another such toy is called Music Blocks by Neurosmith. This toy has a number of blocks with different shapes on them. Children create music by placing the different blocks on a base. Each block has pairs of metal contacts on each face of the block. The pairs of metal contacts are connected through internal resistors. Resistors with different resistances are in the different blocks so that the electronics in the base can identify the particular blocks that are on the base. The base can play different music depending on the blocks that are on the base.

Yet another instructional apparatus is described in U.S. Pat. No. 4,968,255. This patent describes an answer block that has display faces that have uneven distal edges. The edges are defined by notches and ridges, and the edges are discontinuous and interrupted edges.

Although such toys are useful, a number of improvements could be made. For example, a block in the Talking Phonics Blocks toy has only one face that is coded. When using this toy, the child must know beforehand that the coded face must be in contact with the talking stage before any output is produced. Small children may put a non-coded side of the block in contact with the talking stage and may consequently get no response from the toy. The inability of a child to use the block to interact with the talking stage can be frustrating. Second, since one face is structurally coded, that face does not have an image on it. The block is unlike a traditional block since it only has images on only five of six sides. Moreover, all faces of the blocks are not effectively utilized in the Talking Phonics Blocks toy so that the educational content provided by the blocks is limited.

Improvements could also be made to the Music Blocks toy. First, as noted above, the Music Blocks toy has blocks with metal contacts and resistors in them. While such blocks are useful, the use of metal and electronics such as resistors in the blocks adds to the cost of the blocks and the toy as a whole. The electronics that are used with the blocks are also complicated. Second, the Music Blocks toy only produces music and provides no other outputs. Accordingly, the usefulness of the Music Blocks toy is basically limited to teaching children about music.

Improvements could also be made to the blocks in the instructional apparatus described in U.S. Pat. No. 4,968,255. First, the interrupted and discontinuous edges of the answer blocks give the answer blocks an appearance and feeling that is unlike ordinary children's blocks. In this case, children are less likely to use the instructional apparatus if the blocks do not have the look and feel of ordinary blocks. Second, complicated molds and tooling are required to make the interrupted and discontinuous edges of the answer blocks. To the extent that the answer blocks can even be formed, it is difficult to form the answer blocks. Third, the interrupted and discontinuous edges of the answer block are unprotected and can easily be damaged by physical contact with another object. If the uninterrupted and discontinuous edges are damaged, the answer blocks will not work properly as the edge structures are what make the answer blocks work.

Some embodiments of the invention address the above noted problems, individually and collectively. Other embodiments of the invention are directed to new and inventive interactive toys, with or without blocks.

SUMMARY OF THE INVENTION

Embodiments of the invention relate to interactive toys. Some embodiments of the invention use interactive blocks.

One embodiment of the invention is directed to an interactive toy comprising: (a) a housing; (b) a receiving region on the housing; (c) a detection device including a plurality of detectors in the receiving region; (d) a processor operatively coupled to the detection device; (e) a solid object that is capable of being received in the receiving region, the solid object including a first face defined by one or more continuous, uninterrupted edges and having a first structural pattern, and a second face defined by one or more continuous, uninterrupted edges and having a second structural pattern, the first structural pattern being different than the second structural pattern, wherein a different number or combination of detectors in the plurality of detectors is activated when the first structural pattern interfaces with the detection device than when the second structural pattern interfaces with the detection device.

Another embodiment of the invention is directed to a n interactive toy comprising: (a) a housing; (b) a receiving region on the housing; (c) a detection device including a plurality of pressure switches in the receiving region; (d) a processor operatively coupled to the detection device; (e) an output device operatively coupled to the processor; (f) a metal-free solid object in the form of a block to be received in the receiving region, wherein the solid object includes (i) a first face defined by one or more continuous, uninterrupted edges and having a first structural pattern at a border region and a first image at a center region, and (ii) a second face defined by one or more continuous, uninterrupted edges and having a second structural pattern at a border region and a second image at a center region, the first structural pattern being different than the second structural pattern, wherein a different number or combination of detectors in the plurality of detectors is activated when the structural pattern interfaces with the detection device than when the second structural pattern interfaces with the detection device.

Another embodiment of the invention is directed to an interactive book comprising: (a) a housing in the form of a cover or page of the interactive book; (b) a plurality of pages; (c) a segmented binding, wherein portions of the segmented binding are integral with individual pages of the plurality of pages; (d) a processor in the housing; (e) a receiving region on the housing; (f) a detection device in the receiving region; (g) a solid object to be received in the receiving region and to be detected by the detection device; and (h) an output device operatively coupled to the processor.

Another embodiment of the invention is directed to an electronic toy vehicle apparatus comprising: (a) a toy vehicle; (b) a processor inside of the toy vehicle; (c) a speaker operatively coupled to the processor; (d) a memory device associated with the processor, wherein the memory comprises code for audio that comprises educational content; and (e) a motor operatively coupled to the processor for causing the toy vehicle to move.

Another embodiment of the invention is directed to an interactive book comprising: (a) a front cover; (b) a back cover; (c) a binding coupling the front cover and the back cover; (d) a well having sides and a bottom, the well being disposed on the front or back cover of the book, the well being of sufficient depth to receiving a block; (e) a detection device at the sides or bottom of the well and comprising a first set of switches; (f) a programmable processor operatively coupled to the detection device; (g) a plurality of pages between the front cover and the back cover, the pages configured so as not to occlude the well; and (h) a second set of switches associated with the pages, the second set of switches operatively coupled to the programmable processor, wherein the processor causes an audio signal to be generated upon which page is currently being displayed to a user and which face of the block is displayed to the user when the block is placed in the well.

Another embodiment of the invention is directed to a toy train comprising (a) an engine; (b) a loading car attached to the engine, the loading car capable of carrying a block; (c) a set of blocks having a first set of indicia, wherein the blocks are encoded for the indicia; (d) a track having a second set of indicia, wherein the first set of indicia on the blocks matches the second set of indicia on the track; (e) an electronic circuit in the loading car, the electronic circuit capable of detecting the block that is in the loading car; and (f) a processor in the engine.

Another embodiments of the invention is directed to a toy block comprising: a solid body including six faces, wherein the six faces include (a) a first face defined by one or more continuous, uninterrupted edges and having a first structural pattern, and (b) a second face defined by one or more continuous, uninterrupted edges and having a second structural pattern, the first structural pattern being different than the second structural pattern.

These and other embodiments of the invention are described in further detail below.

DETAILED DESCRIPTION

Figure 1A:
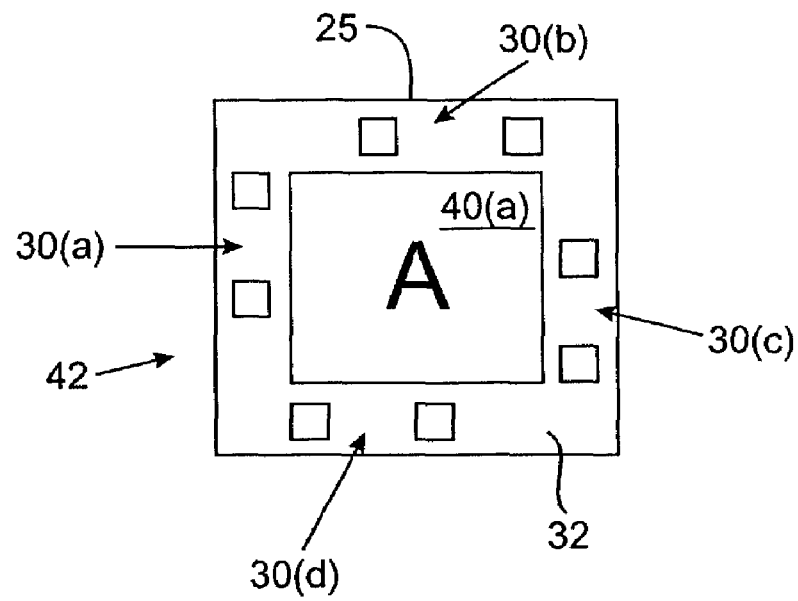
FIG. 1(a) shows a plan view of a first face of a block according to an embodiment of the invention.

Embodiments of the invention are directed to interactive toys and in particular, educational toys. The educational toys according to embodiments of the invention can be adapted to teach a child about any suitable subject including, but not limited to numbers (e.g., recognition, sequence, and sounds), letters (e.g., recognition, sequence, and sounds), math, phonics, phonemes, animal names, animal sounds, animal facts, words, spelling, geography, counting, reading, fun facts, foreign languages, history, science, etc. Audio or visual outputs corresponding to any of these or other subjects can be preprogrammed into a memory associated with the toys.

Embodiments of the invention include interactive toys using solid objects, interactive books (with or without solid objects), and electronic toy vehicle apparatuses (with or without solid objects). The electronic toy vehicle apparatuses preferably include electronic toy trains and train tracks. Embodiments of the invention are fun, and engaging, and are adapted to teach children about one or more of the above-noted subjects or other subjects.

I. Interactive Toys with Solid Objects

Embodiments of the invention are directed to an interactive toy comprising a housing. A receiving region is on the housing. A solid object is capable of being received in the receiving region. The solid object includes a first face with a first structural pattern and a second face with a second structural pattern, the first structural pattern being different than the second structural pattern. The first and second structural patterns can interface with a detection device including a plurality of detectors in the receiving region. A different number and/or combination of detectors in the plurality of detectors is activated when the first face is in contact with the detection device than when the second face is in contact with the detection device. Different signals can be sent to a processor operatively coupled to the detection device depending on which detectors are activated. In response, the processor can cause different outputs to be produced. Preferably, a sound corresponding to an image on a block is produced when the structural pattern on another face interfaces with the detection device. The edges of the solid objects are continuous and uninterrupted so that they look and feel like ordinary children's blocks. In some embodiments, all edges of the solid object are smooth and even.

The solid object may be in any suitable form. For example, the solid object may be a cylinder, with first and second opposite faces. The first and second faces can have respectively different structural patterns on them. In other embodiments, the solid object is a rectangular block or a square block. The solid object can be made of a non-conductive material such as plastic or wood. In preferred embodiments, the solid object is free of metal and free of electronics such as resistors. For purposes of illustration, embodiments of the invention will be described with respect to solid objects that are in the form of square blocks. It is understood, however, that embodiments of the invention are not limited to square blocks.

The solid object may be one in a set of solid objects that may correspond to a particular theme or a particular subject. For example, embodiments of the invention may include a set of square-faced blocks with different images that are printed on or formed on the faces of the blocks. The blocks could have, for instance, the images of the letters A-Z printed on the faces of seven blocks along with respective images of objects that start with the letters A-Z. In another example, the block faces could have images of basic shapes, and/or number sequences on them (e.g., the numbers 1-10 or 1-100). In another example, the block faces could have images of animals and/or vehicles on them. The images may be printed on stickers or directly on the blocks, or they may be relief images.

The faces of the blocks can have structural patterns on the different faces of the blocks and at different regions of the different faces. A child can manipulate the blocks so that a structural pattern can interface with a detection device in a receiving region of a housing of a base unit. Then, electronics in the base unit can identify which block is in the receiving region and/or which block face is currently being presented to the user. In embodiments of the invention, more than one face of the block is structurally encoded to provide an audio and/or visual output that corresponds to an image on a different face of the block. If the block is a square-faced block, each face of the block can be structurally encoded, and can have one or more images on it. A child can place any face against the detection device in the receiving region of the base unit so that the base unit provides an output.

The blocks according to embodiments of the invention can each have a first face defined by one or more continuous, uninterrupted edges. The first block face can have at least one first structural pattern at a side edge region of the first face. A second face of the block can be defined by one or more continuous, uninterrupted edges, and can have at least one second structural pattern. If the block face is a rectangle or a square, the continuous, uninterrupted edges defining the block face can be straight lines. If the block face is a circle, as in a cylindrical block, the continuous, uninterrupted edge can be the curved line that forms a circle. A child may play with the solid object as they would any other solid object. For example, the blocks according to embodiments of the invention can be stacked and/or knocked down like regular blocks.

Embodiments of the invention have a number of advantages. First, preferred embodiments of the invention have no metal and no internal electronic components (e.g., no resistors). By using no metal or electronic components in the blocks, the costs associated with making the blocks and the costs for the raw materials used in the blocks are less than conventional interactive blocks. Second, in preferred embodiments, any face can be in contact with a detection device in a receiving region of the housing of a base unit and the base unit can still provide an output. Unlike conventional toys, this makes every face of the block interactive thus maximizing the usefulness and educational content of each block. In addition, as will be explained in further detail below, the orientation of the block within a receiving region can be changed while providing the same output. Embodiments of the invention are not as orientation dependent as blocks in conventional block toys. Unlike the conventional block toys, a very young child can still play with the blocks and receive some audible response from the toy. Unlike the Talking Phonics Block toy, a child need not worry about orienting the exact face against a talking stage. The same or different sounds (or other outputs) can be provided if the child orients the block upward, but changes the orientation of the block (e.g., by rotating the block 90 degrees and then re-inserting it into the well). Accordingly, using embodiments of the invention, children can have fun learning while manipulating blocks and receiving different outputs. Third, every face of the block can have an image on it. This makes the blocks appear to be more like traditional blocks and children can play with the blocks. For example, a block according to an embodiment of the invention can have six images and six different structural patterns on the six respective faces of the block. Each structural pattern can encode for an output associated with an image that is on another face of the block. Fourth, the blocks can be depressed to produce audio or visual outputs. In some embodiments, they can be depressed to cause a toy to perform other functions. For instance, as explained in detail below, a block can be depressed in a loading car in a toy train to cause the train to start moving. Thus, the blocks and the toys according to embodiments of the invention have a greater range of contemplated usefulness than conventional blocks and toys. Fifth, the blocks according to an embodiment of the invention can have continuous, uninterrupted edges that define faces of the blocks. The structural patterns which code for certain block faces can be located inwardly from the continuous, uninterrupted edges so that the structural patterns are protected from damage. In addition, blocks with continuous, uninterrupted edges look and feel more like traditional blocks so that children are more likely to use them than, for example, the answer blocks described above. Also, blocks that have continuous and uninterrupted edges are easier to make than blocks with discontinuous, interrupted, and uneven edges.

FIG. 1(a) shows a block 42 with a first face 40(a) defined by four sides of substantially equal length. As shown, the four side edges 25 are continuous and interrupted, and are four straight lines. The first face 40(a) includes a border region 32 that surrounds a central region with an image of the letter A on it. The border region 32 has four side border regions, each side border region having a first structural pattern 30(a)-30(d). Each first structural pattern 30(a)-30(d) is the same and may comprise solid portions and holes. The border region 32 surrounds a central region that has an image of the letter "A" in it. In this embodiment, each of the first structural patterns 30(a)-30(d) is defined by a pair of spaced apart holes and solid regions. As will be described in further detail below, the pair of holes and solid regions can interface with particular detectors in a detection device. A processor (not shown) operatively coupled to the detection device (not shown) can then determine which face of the block 42 is currently being presented to the child so that an appropriate output can be produced by the toy.

Figure 1B:
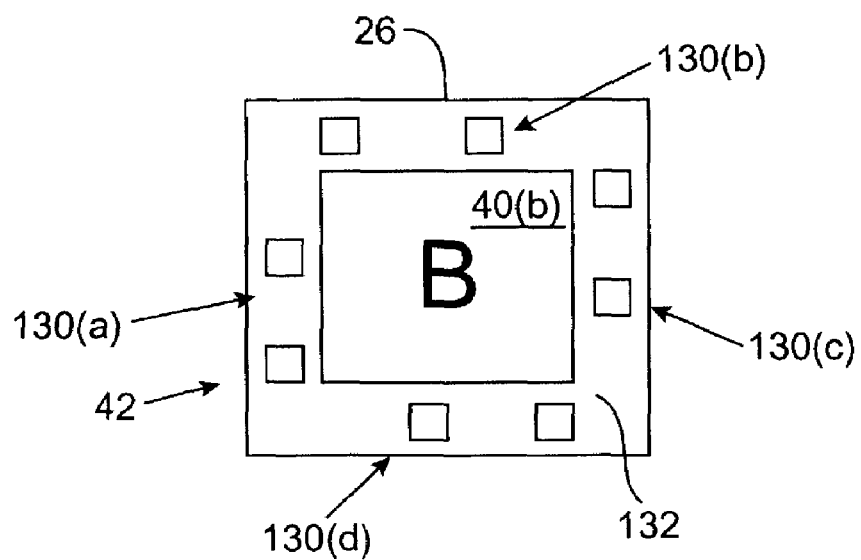
FIG. 1(b) shows a plan view of a second face of the block shown in FIG. 1(a).

FIG. 1(b) shows a second face 40(b) of the block 42 shown in FIG. 1(a). The second face 40(b) is defined by four side edges 26 that are continuous and uninterrupted, and are four straight lines. In this example, the second face 40(b) is at the opposite side of the block 42 as the first face 40(a). However, in other embodiments, the first and second faces could be adjacent faces on a block. The second face 40(b) also has a border region 132 and the border region includes four side regions with four second structural patterns 130(a)-130(d). As is apparent from FIGS. 1(a) and 1(b), each of the first structural patterns 30(a)-30(d) is different than each of the second structural patterns 130(a)-130(d).

Figure 2:
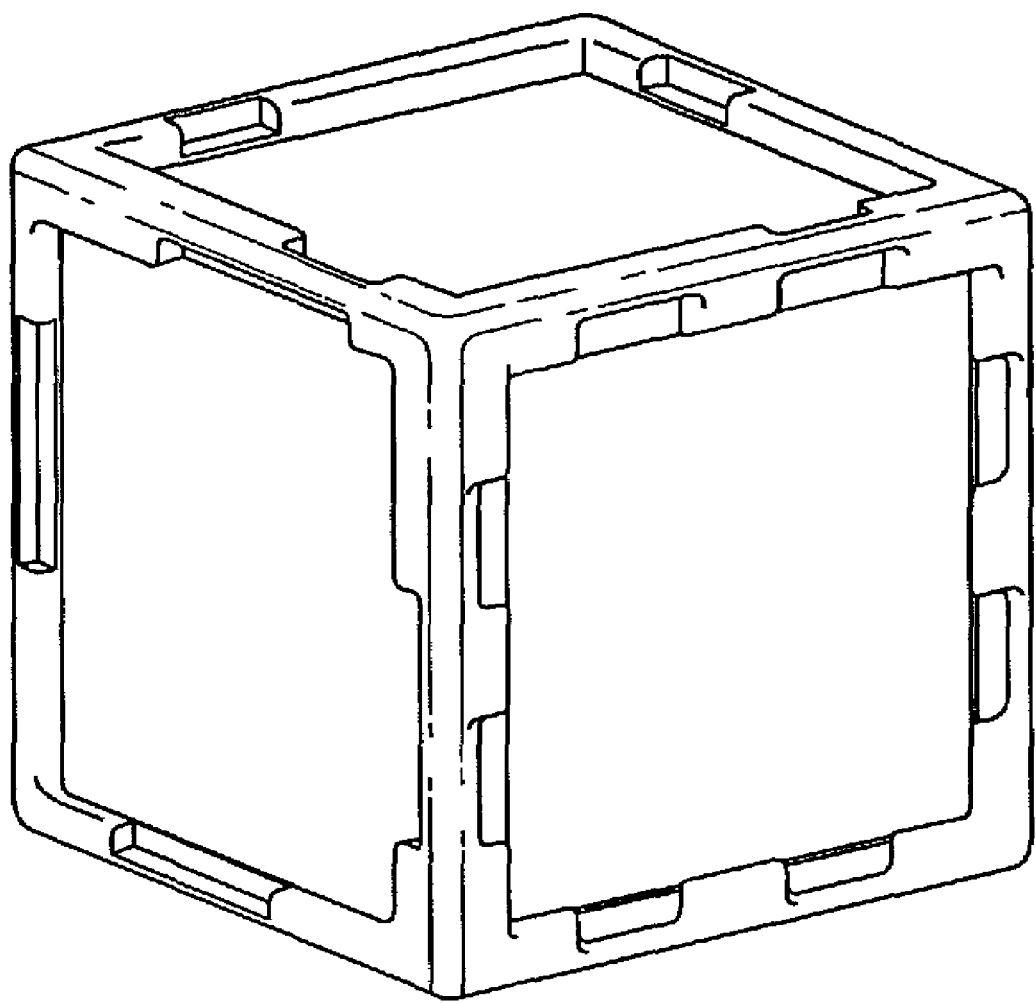
FIG. 2 shows a perspective view of a block according to an embodiment of the invention.

FIG. 2 shows a perspective view of a block according to an embodiment of the invention. As shown, the block is aesthetically pleasing, and has edges that are continuous and uninterrupted.

Figure 3:
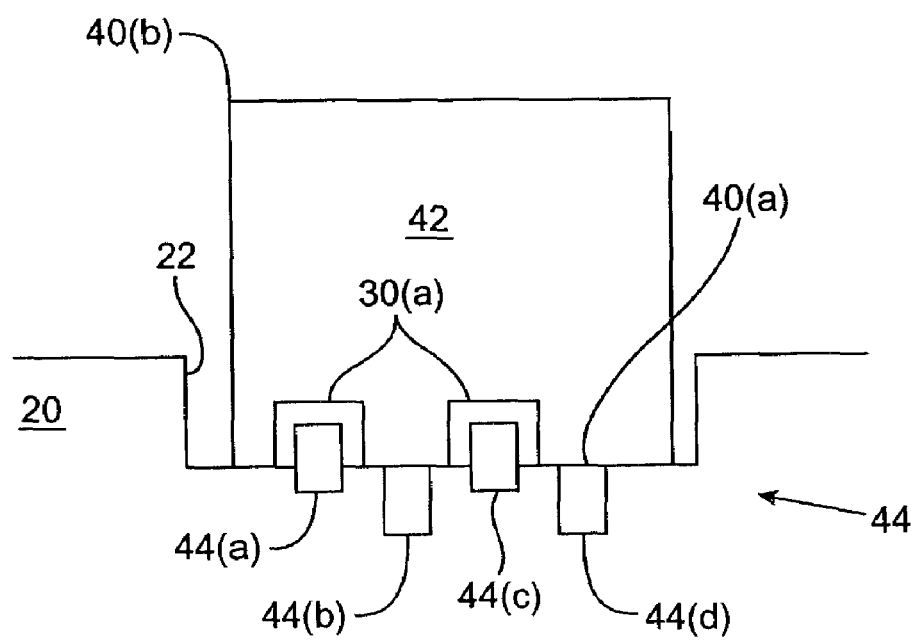
FIG. 3 shows a side cross-sectional view of the block shown in FIGS. 1(a) and 1(b) as it interacts with a detection device.

FIG. 3 shows the block 42 when it is in a well 22 that is formed in a housing 20. In FIG. 3, the first face 40(a) is in contact with the bottom of the well 22 while the second face 40(b) faces upward and is displayed to the child using the toy.

As shown in FIG. 3, the first structural pattern 30(a) interfaces with a detection device 44 in the well 22. The detection device 44 includes a plurality of detectors 44(a)-44(d). In some embodiments, the plurality of detectors 44(a)-44(d) comprises a plurality of depressible pressure switches (for simplicity of illustration, the metal contacts associated with the detectors are not illustrated). Each of the detectors 44(a)-44(d) can be upwardly biased so that it projects upward in the absence of downward pressure. As shown in FIG. 3, two of the detectors 44(b), 44(d) are depressed by the first face 40(a) of the block 42 while the other two detectors 44(a), 44(c) are not depressed and are received in the two holes that at least partially form the first structural pattern 30(a). A predetermined number and/or pattern of detectors 44(a)-44(d) can be activated once the first structural pattern 30(a) interfaces with the detection device 44. Another structural pattern on another block face might cause detectors 44(a) and 44(c) to be depressed while leaving detectors 44(b) and 44(d) not depressed so that a different output is produced.

By activating a predetermined number or combination of detectors 44(a)-44(d), a specific signal is received by a processor (not shown) in the toy and an output corresponding to an image on the block that is not on the first face 40(a) can be produced. For example, in the illustrated embodiment, the second face 40(b) of the block 42 faces upward toward the child. An audio output corresponding to the letter "B" (e.g., "B says buh") on the second face 40(b) of the block 42 can be produced after a predetermined number of detectors 44(a)-44(d) in the detection device 44 is activated by the first structural pattern 30(a) on the first face 40(a).

Figure 4:
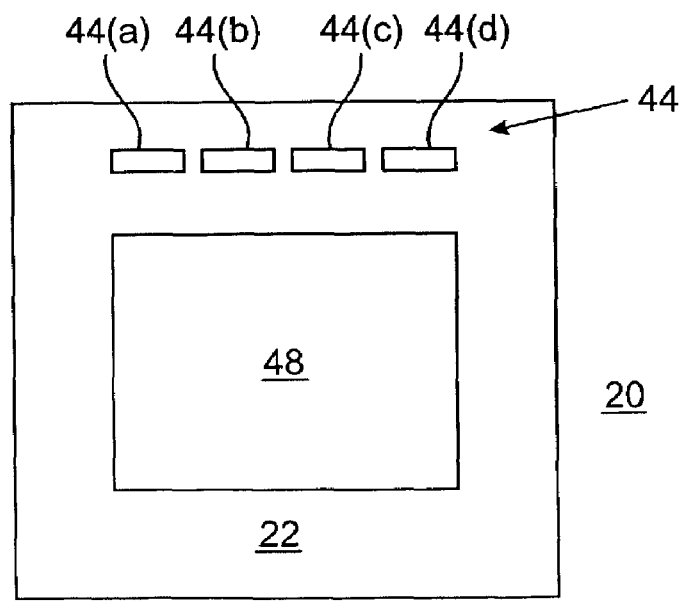
FIG. 4 shows a plan view of a receiving region in the form of a well, the receiving region including a detection device.

FIG. 4 shows a plan view of a well 22 in a housing 20 of a base unit according to an embodiment of the invention. In this example, the well 22 has four side surfaces and a bottom surface. The well 22 is cooperatively structured to receive a solid object such as a block.

A detection device 44 including a plurality of detectors 44(a)-44(d) is at one end of the bottom of the well 22. In this example, the detection device 44 is positioned to interact with only one of the four first structural patterns of a block at a time (such as the above-described blocks), but is capable of interacting with any of the four first structural patterns by changing an orientation of the solid object within the well. Each of the detectors 44(a)-44(d) in the detection device 44 can be upwardly biased with a spring or other biasing device. A depressible button 48 is at a central region of the bottom of the well 22. Like the detectors 44(a)-44(d), the depressible button 48 is also upwardly biased, but is slightly higher than the detectors 44(a)-44(d). When the block 42 is in the well 22 without applied pressure, it sits on the depressible button 48. No output is produced until the child presses down on the block 42, which presses down on the depressible button 48. At the same time, a specific number and/or combination of detectors 44(a)-44(d) is depressed by the solid portions of the structural pattern that interfaces with the detection device 44. The depressed depressible button 48 activates a switch (not shown) and sends a signal to the processor that the child has pressed down on the block 42. By having the depressible button 48, the block 42 seems more like an interactive button when it is in the well 22 of the housing 20. The action of pressing the block 42 down just prior to receiving an audio output reinforces the image on the block 42 in the child's mind, while also adding an extra dimension of interactivity with the toy as compared to a toy that does not have the depressible button 48.

As noted above, a predetermined number or combination of detectors 44(a)-44(d) is activated thus informing the processor of the particular block face that is currently being displayed to the child. Advantageously, the block 42 acts like a depressible button that can be depressed by a child. The child can press down on the block 42 to receive a first audio output that corresponds to the face of the block that faces up. Then, the child can remove the block 42 from the well 22, flip it over, and then put the block 42 back in the well 22 so that a different face of the block faces up. The child can push the block 42 down again to receive a second audio output.

Other embodiments are also possible. Also, although the detection device 44 is shown as being at the bottom of the well 22, in other embodiments, the detection device 44 could be on the sidewalls of the well 22. In yet other embodiments, it is possible to have two or more detection devices 44 in the well or in the receiving region. For example, one detection device could be at the bottom of the well while another detection device might be at a side wall of the well. This could be done in order to ensure redundancy of operation in case one of the detectors in one of the detection devices sticks or is inoperative for some reason.

Redundancy could be provided in other ways than using multiple detection devices. For example, more detectors (e.g., seven detectors) can be provided in the detection device so that two (or more) different combinations and/or numbers of detectors can be activated using a single block face. Illustratively, a detection device may have seven detectors labeled 1 to 7 and a block face may activate detectors 1, 3, 5, and 7. A first combination of activated detectors 1 and 3 alone may indicate that a particular block face is being displayed. A second combination of activated detectors 5 and 7 may indicate that that same block face is being displayed. If, for example, detector 1 is inoperative, then the second combination of detectors 5 and 7 would still indicate to a processor in the toy that the particular block face is being displayed to the child. This redundancy can be pre-programmed into a memory device associated with the toy by those of ordinary skill in the art. As noted, this redundancy is desirable because it ensures that the appropriate output is provided in case one or more of the detectors becomes inoperative.

Figure 5:
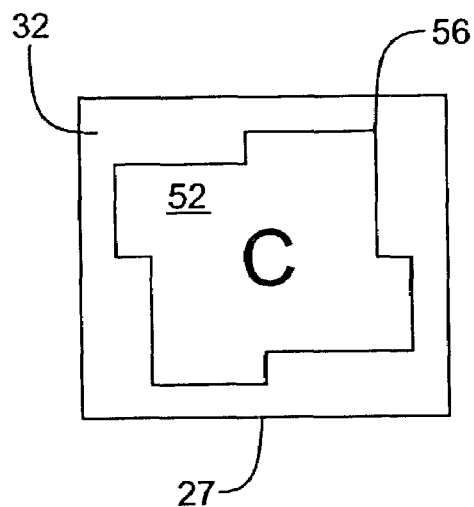
FIG. 5 shows a plan view of a block face of a block according to another embodiment of the invention.

FIG. 5 shows a block according to another embodiment of the invention. The block includes a border region 32 and a central region 52. An image of the letter "C" is on the central region 52. In this example, the central region is recessed with respect to the border region 32. Unlike the prior block embodiments, the block shown in FIG. 5 has a structural pattern that is formed by a continuous, changing border structure that does not have holes in it. The block shown in FIG. 5 also has four continuous and uninterrupted edges 27 in the form of straight lines.

The first, second, third, fourth, etc. structural patterns on the solid objects may be in any form. For example, as shown above, they can be in the form of side border regions with holes in them. In another embodiment, a block face of a block can have a side border region and can include a continuous solid border with a depressed central region. As shown in FIG. 5, the continuous solid border can have varying widths. In yet other embodiments, it is possible to have structural patterns that code for various block faces in the central regions of the block (along with images). However, the use of structural patterns in the border regions is preferred.

Figure 6:
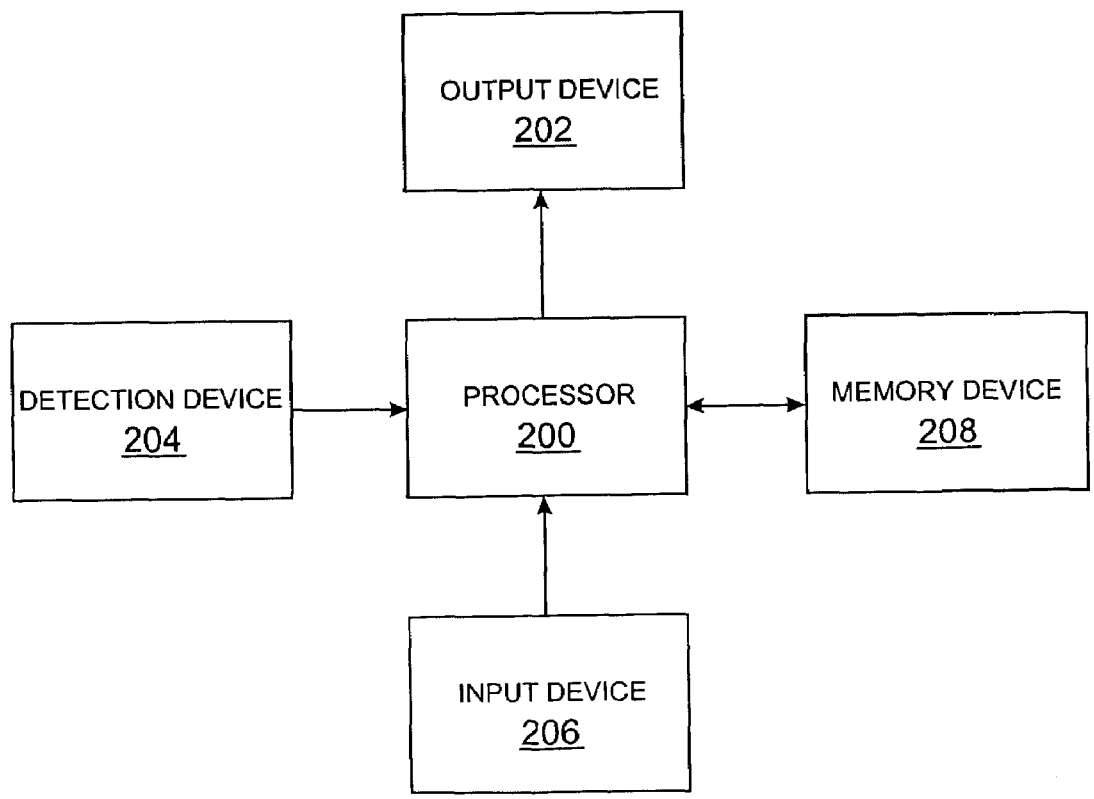
FIG. 6 shows a block diagram of some functional components of an interactive toy according to an embodiment of the invention.

FIG. 6 shows a block diagram of some components in the toy according to an embodiment of the invention. The block diagram shows a processor 200 coupled to a memory device 208, an input device 206, and a detection device 204. An output device 202 is also operatively coupled to the processor 200. If the output device 202 includes an audio output device such as speaker, a speech synthesizer (not shown) may be used to create synthesized human speech.

The speech synthesizer can be a speech synthesizer chip that is separate from a microprocessor that facilitates the interaction between the various components in the interactive apparatus. Alternatively, the speech synthesizer can be incorporated onto a computer chip along with logic circuitry that facilitates the interaction between the various components in the toy.

The output device 202 can provide audio output for the user. Examples of audio output devices include speakers and earphone jacks (with associated amplifiers). Other output devices such as visual output devices (not shown) can be used in addition, or as an alternative, to the output device 202. Examples of visual output devices include LCDs (liquid crystal displays), LED (light emitting diodes), lights, etc. Other output devices include motors (as described in the embodiments below).

The memory device 208 may be any suitable temporary or permanent information storage device. The memory device 208 may include optical, magnetic, or electronic storage media such as optical or magnetic disks, tapes, sticks, and the like. Any suitable combination of information storage devices can collectively make up the memory device 208. In some embodiments, the memory device 208 can include one or more RAM (random access memory), ROM (read only memory) and EPROM (erasable programmable memory) chips or chip portions that are separate from or are integrated with the processor 200.

The memory device 208 can store any suitable information. For example, the memory device 208 can store pre-recorded audio for the toy. The memory device 208 can also comprise operating instructions for the toy and code for performing any of the described toy functions herein.

The memory device 208 can store any suitable audio or visual outputs that are educational. Exemplary audio or visual outputs may relate to numbers (e.g., recognition, sequence, and sounds), letters (e.g., recognition, sequence, and sounds), math, phonics, phonemes, animal names, animal sounds, animal facts, phonics, words, spelling, geography, counting, reading, fun facts, foreign languages, history, science, etc. Audio or visual outputs corresponding to any of these or other subjects can be preprogrammed into the memory device associated with the toys, or could be loaded into the memory device from an external source.

The audio or visual outputs may be informative, or may quiz the child on a particular subject. Thus, the audio or visual outputs can be produced in response to a child's use of a solid object, or may be produced prior to a child's use of a solid object. For example, the audio or visual output may be a question such as "can you find my cow?" The child may then be asked to place a block in a well in the book so that the face of the block with a cow is displayed to the child.

The different toys that can use the above-described blocks are not limited. More specific toy embodiments including a toy interactive book and toy train are described with respect to FIGS. 7(a)-10. Other suitable toys include toy vehicles (such as toy boats, cars, trucks, and planes), toy control panels, toy computers, toy phones, toy tables, toy animals, toy cash registers, toy dolls, toy refrigerator magnets, etc.

Moreover, other alternative embodiments of the invention are also possible. For example, although a toy with a housing and a single well for receiving a block is explicitly described, the housing may include a plurality of wells that receive a plurality of the structurally encoded blocks in other embodiments. By using a plurality of wells and a plurality of blocks, spelling or pattern recognition could be taught using embodiments of the invention. For example, the toy may ask a child to spell a word or create a specific pattern. The child may respond by putting the appropriate blocks in the appropriate wells to spell the word or create the pattern. The toy may respond by stating whether or not the child is correct or incorrect. In another example, although many of the above-described blocks have the same first structural pattern or the same second structural pattern at the four side border regions of a single face of a block, in other embodiments, it is possible to have different structural patterns at different side regions on a single face of a block. For example, in these examples, different block orientations with the same face facing up may produce different outputs from the toy. Lastly, although the block-receiving wells are described in detail below, it is also possible to have a non-recessed receiving region with a detection device instead in some embodiments. For example, a receiving region could be a flat surface with a plurality of pressure switches that project upward from the receiving region.

II. Interactive Electronic Toy Books

Other embodiments of the invention are directed to interactive electronic toy books that can be used with solid objects described above, or with different solid objects. For example, one embodiment is directed to an interactive book comprising a housing in the form of a cover or page of the interactive book. The book has a plurality of pages and a segmented binding, wherein portions of the segmented binding are integral with individual pages of the plurality of pages. A processor is in the housing and a receiving region is on the housing. A detection device is in the receiving region. A solid object can be received in the receiving region and can be detected by the detection device. An output device is operatively coupled to the processor. The output device preferably comprises a speaker.

Figure 7A:
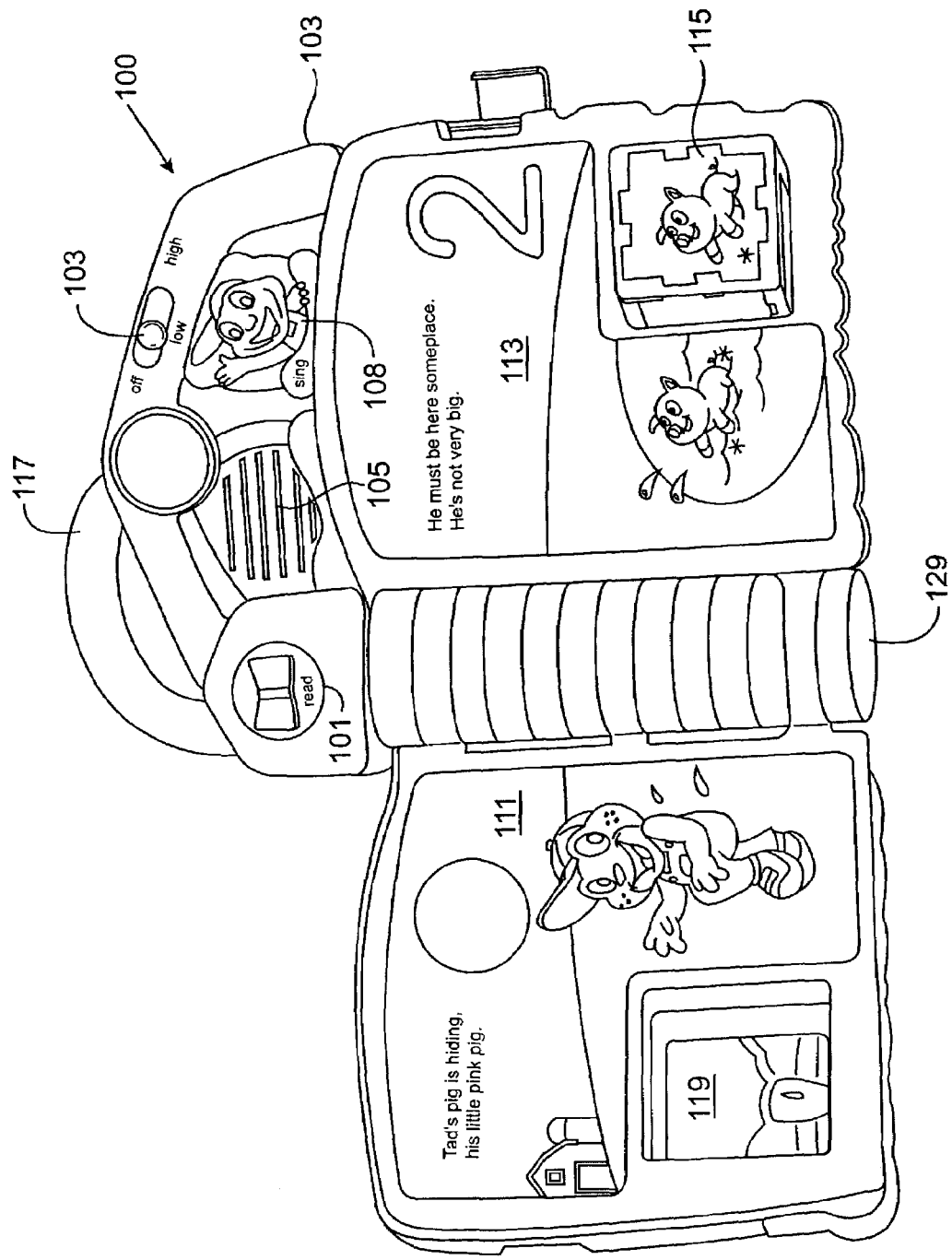
FIG. 7(a) shows an electronic toy book according to an embodiment of the invention in an open position.

FIG. 7(a) shows an interactive book 100 according to an embodiment of the invention in an open position. The interactive book 100 includes a housing 103 with a read button 101 and a music button 108. The housing 103 also includes a handle 117 and also forms the back cover of the interactive book 100. The interactive book 100 has pages 111, 113 and a segmented binding 129. Portions of the segmented binding 129 are integrally formed with the pages 111, 113 of the interactive book 100. When the pages 111, 113 of the interactive book 110 turn, a series of switches (not shown) inside of the segmented binding 129 are activated to inform the processor (not shown) inside of the interactive book 100 that the illustrated pages 111, 113 are being displayed to the child. An off/low/high (volume) switch 103 is at the upper part of the interactive book 100 to allow a child to turn the book 100 off or change the volume. A speaker 105 is also at the upper part of the interactive book 100.

Each of the pages 111, 113 includes an aperture 119 and each of the pages can be tabbed. The apertures in the pages 111, 113 of the interactive book 100 are aligned with a well in the housing 103. It is apparent that the pages of the interactive book 100 can be configured so as to not occlude the well that is formed in the housing 103 (or back cover) of the interactive book 100. As shown in FIG. 7(a), a block 115 can fit within the well in the housing 103 and within the aligned apertures of the pages of the interactive book 100.

Figure 7B:
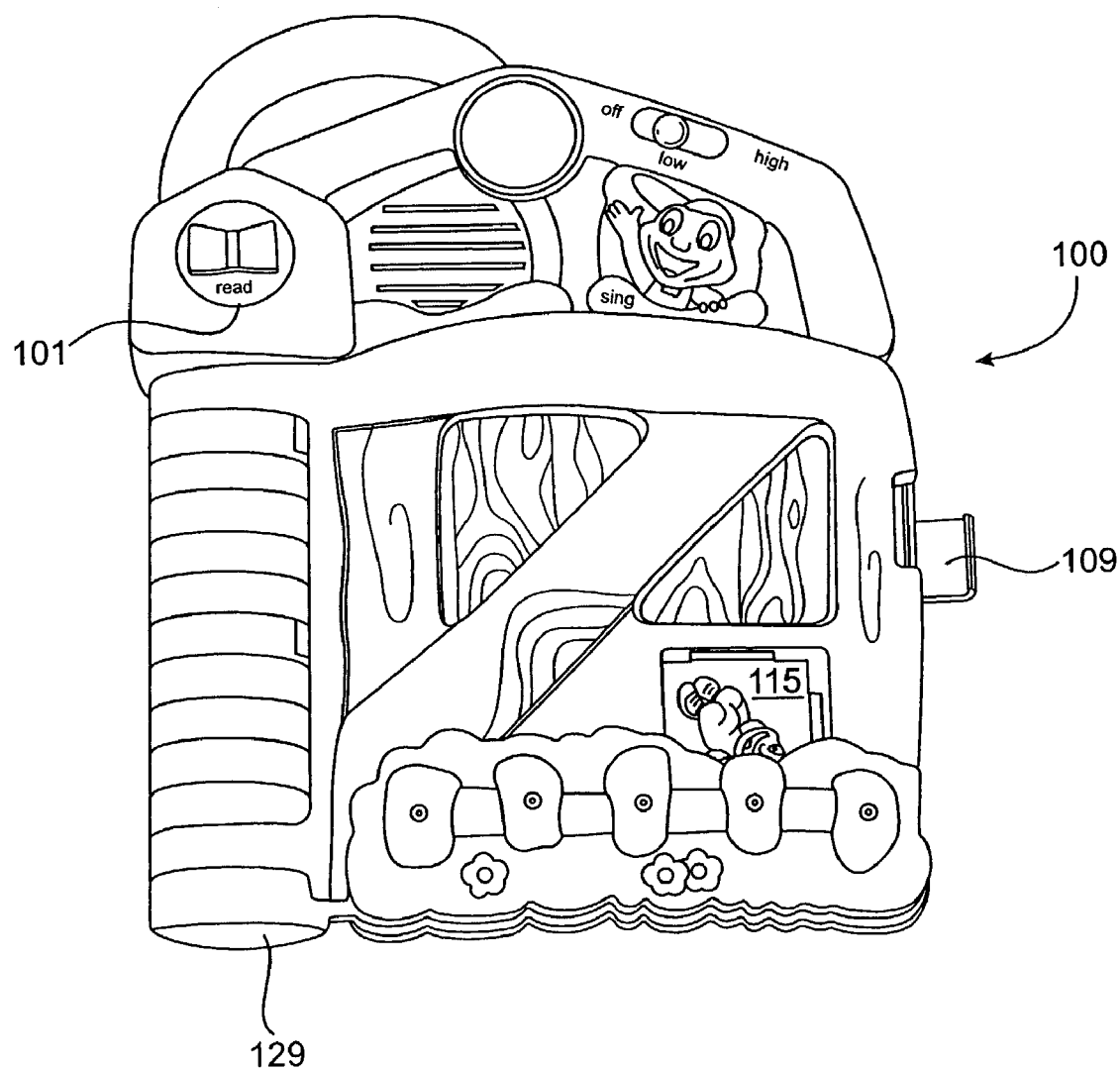
FIG. 7(b) shows the electronic toy book shown in FIG. 7(a) in a closed position.

FIG. 7(b) shows the interactive book 100 in a closed position. A latch 109 may secure the covers of the book together, and may further secure the block 115 in between the covers of the interactive book 100. The block 115 can have any of the features of the above-described blocks. In this example, the interactive book 100 is in the form of a barn.

The well (not shown) that holds the block 115 may be similar in configuration to the well 22 shown in FIG. 4. When the block 115 is in the well and pressure is not applied to the block by a child, the block 115 sits on top of the depressible button 48 and no output is produced. A child can then push down on the block 115 thereby depressing the depressible button 48. Depressing the depressible button informs the processor (not shown) inside of the interactive book 100 that the block 133 has been pushed and that the block 133 is within the well. Also, like the previously described blocks, the block 115 has border regions 133 that are structurally coded. The structurally coded border regions can activate a predetermined number of the detectors 44(a)-44(d) in the detection device 44 thus informing the interactive book 100 as to which block face is currently being displayed to the child. As described above, the set of detectors 44(a)-44(d) may be a set of electronic switches.

In FIG. 7(a), the bottom face of the block 115 is not shown. However, like the top face of the block 115, the bottom face of the block 115 can have four structurally encoded side border regions. By having four structurally encoded side border regions in the block 115, a child can orient the block 115 in any way in the well and can receive some output from the toy 100. For example, with reference to FIG. 7(a), the block 115 can be oriented with the image of a pig right side up, upside-down, to the right, or to the left. In each of these cases, after the child presses down on the block 115, the interactive book will produce a sound of a pig making an "oink" sound.

The use of the toy interactive book 100 can be described with reference to FIG. 7(a). First, a child can turn on the interactive book 100 by using the off/low/high switch 103 (corresponding to off, low volume, and high volume). In some embodiments, the interactive book 100 can automatically turn off after a predetermined amount of inactivity (e.g., 30 seconds of inactivity). Then, as shown in FIG. 7(a), the interactive book 100 can be opened. A switch in the binding 129 can activate, and the audio may include something like "Tad's pig is hiding, his little pink pig. He must be here some place. He is not very big. There is one pig. Can you find the other?" When the child puts in the block 115 with the picture of the pig facing up, it will appear as if there are two pigs on the page. The image on face on the block 115 also appears to the child as if the image is part of the page 113. This makes the interactive book 100 fun and engaging. Books with binding activated switches are known in the art, but are not known with the various inventive features described herein.

Depressing the read button 101 and the music button 183 causes the electronic toy to read the words on the pages currently being displayed to the user or play music that is associated that the images on the pages that are currently being displayed to the user. For example, to hear the interactive book 100 read the story on the pages 111, 113 again, a child can press the read button 101. To hear about fun song about the animals on the pages 111, 113, a child can press the music button 108. If the child presses the music button 183, then a song about two pigs can play (e.g., "Farmer Tad had two pigs, oink, oink, oink, oink, oink"). In other embodiments, pictures of animals such as cows, pigs, sheep, dogs, and ducks can be on the different pages of the book 100 and can also be on the faces of the block 115.

To hear the name and sound of an animal, the block 115 is inserted into the well in the housing 103 so that the side facing up matches the picture on the pages. For example, as shown in FIG. 7(a), page 113 has the picture of a pig on it while the image on the block 115 that faces up is also a pig. When a child presses down on the block 115, the sound of a pig will be produced via the speaker 105. The child will then get a congratulatory message for correctly selecting the pig. For example, if the child puts the block 115 into the well with the image of the pig facing up, while the pictures on pages 111, 113 show a pig, then the audio output from the book 100 may say "Thank you! You found my pig!"

If the incorrect animal image faces up, then the book 100 will sound the name of the animal to help the child with animal recognition. If the child puts the block 115 into the well with the image of the cow, lamb, pup, or chick facing up while the pictures on the pages 111, 113 show a pig, the book 100 may say, respectively, "moo", "baaa", "woof", and "peep", and then "you found my/(pig, lamb, pup, chick)!" Other suitable audio scripts and play patterns are described in U.S. Provisional Patent Application No. 60/346,326, filed on Jan. 5, 2002, which is herein incorporated by reference in its entirety.

In these specific interactive book embodiments, any of the above described interactive block embodiments may be used. Preferably, blocks of the type shown in FIGS. 1-5 are used. However, other blocks can be used in other embodiments. For example, the type of blocks that are used in the Music Blocks toy could be used in these book embodiments.

Also, although only a single block is described with the interactive book, it is understood that an interactive book could have a plurality of blocks associated with it. For example, a set of blocks with the letters A-Z printed on the faces of the blocks could be used with an interactive book with a single receiving region for a block. Audio for these additional blocks could be supplied through an external data cartridge, or could be stored inside of a memory device that is inside of the interactive book.

Thus, the interactive book 100 has a number of advantageous features. First, the interactive book embodiments can teach story telling, counting, animal identification, and music, all in a single toy. The interactive book 100 can also introduces numbers (e.g., the numbers 1-5), shape sorting to stimulate and improve motor skills, animal recognition, animal sounds, and cause and effect. For instance, turning pages, grasping the block, and pressings buttons helps develop fine motor skills. Auditory skills are also developed using embodiments of the invention. The story, songs, and animal sounds encourage a child's listening skills. Cognitive skills are developed. Block play involves the child in the reading experience and introduces cause and effect. Language skills are developed. Beginning stories help to develop a baby's or infant's understanding of language concepts.

Figure 8:
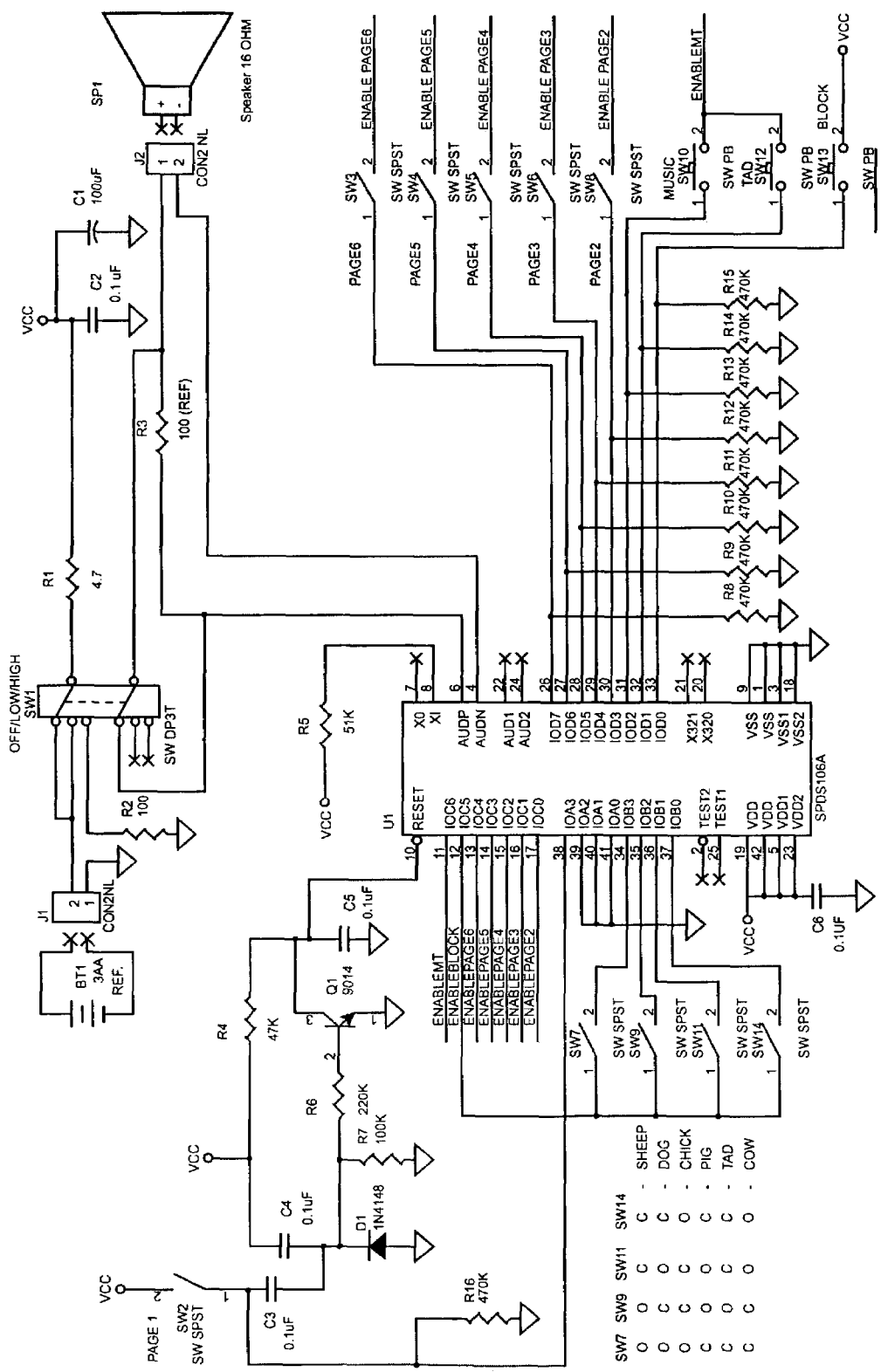
FIG. 8 shows a circuit diagram of a circuit that can be used in an electronic toy book of the type shown in FIGS. 7(a) and 7(b).

In the book embodiment, the electronic configuration shown in FIG. 6 could be used. A more specific exemplary circuit diagram for the interactive electronic block book 100 shown in FIGS. 7(a)-7(b) is shown in FIG. 8. As shown, an SPDS 106A chip is used and contains both a microprocessor and ROM for program and audio data. Such chips are commercially available from Sunplus, Inc. It is understood that any suitable circuit configuration can be used in embodiments of the invention.

III. Electronic Toy Vehicle Apparatuses

Other embodiments of the invention are directed to electronic toy vehicle apparatuses. In preferred embodiments, the electronic toy vehicle apparatuses include electronic toy trains (with or without a track). In more preferred embodiments, the electronic toy trains use solid objects. In the description below, electronic toy trains are described in detail. It is understood, however, that embodiments of the invention can be include electronic toy vehicles generally. For example, the general concepts that are described for a toy train can be applied to an electronic toy truck or other vehicle that runs on a track (or simulated road).

In one embodiment of the invention, the electronic toy train comprises an engine and a train car coupled to the engine. A processor is inside of the train or the train car. A speaker is operatively coupled to the processor. A memory device is associated with the processor, and the memory can comprise code for audio that is selected to educate a child. Examples of educational content that can be preprogrammed into the memory device are provided above and need not be repeated here. In preferred embodiments, the audio content relates to the names and sounds of the letters of the alphabet. Such audio content may be purely educational in nature, and need not have any relation to trains or train sounds.

Figure 9A:
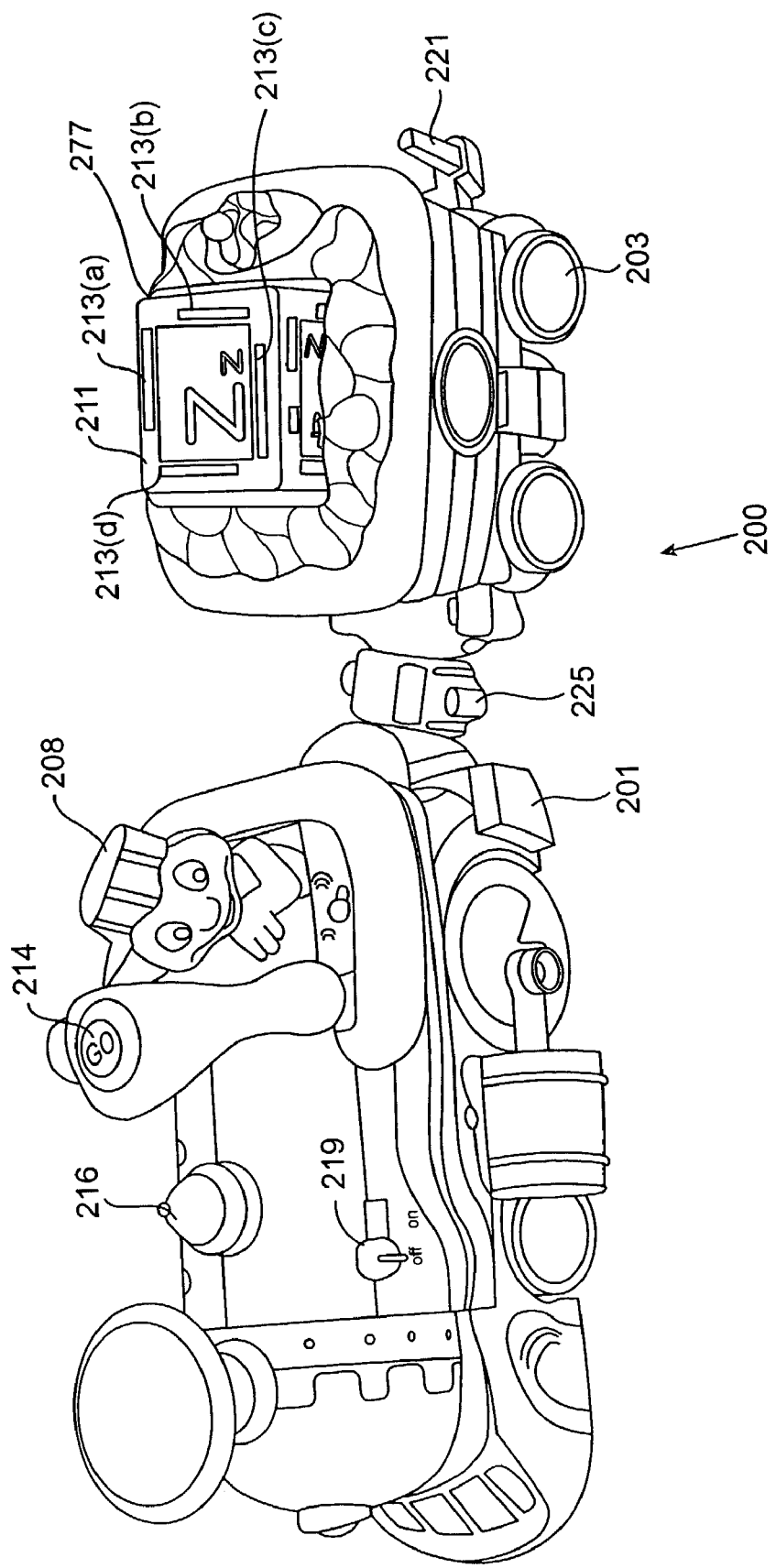
FIG. 9(a) shows a perspective view of a train engine and loading car.

FIG. 9(a) shows an electronic toy train 200 according to an embodiment of the invention. A detailed discussion of the toy train 200 including various audio scripts that can be used is in U.S. Provisional Application No. 60/346,454, filed Jan. 5, 2002 which is herein incorporated by reference for all purposes.

The electronic toy train 200 includes an engine 201 and a loading car 203 coupled together with coupling elements 225 that allow the engine 201 and the loading car 203 to swivel with respect to each other. Another coupling element 221 is shown at the end of the loading car 203. Other train cars such as a caboose can be coupled to the coupling element 221 like other toy trains. The electronic toy train 200 can use any suitable power source including batteries that are stored in the engine 201 or the loading car 203. The power source can be used to drive a motor (not shown) in the engine 201. The motor drives the wheels of the toy train 200 so that it can move on its own.

The engine 201 includes a number of switching elements that perform different functions including an on/off switch 219 and volume control switch (not shown). Other switching elements include an arch 214 with a "Go" button on it, a plastic figurine 208 in the form of a frog, and a bell 216. Each of these elements can be toggled to cause the toy train 200 to produce some sound or initiate some action. For example, to start and stop the train 200, a child can press the Go button on the arch 214. Pressing the bell 216 causes the train 200 to produce the sound of a bell. Toggling the plastic figurine 208 causes the train 200 to produce a sound associated with the plastic figurine 208. For example, the sound "all aboard!" can be produced after a child toggles the plastic figurine 208. Yet another switching element can be located in the wheels of the train to inform a processor in the train that the train is off the track. The switching element can be activated when, for example, the front wheel of the train moves vertically after the train is running on the track. After this switching element as activated (e.g., if the train goes off the track or if the child picks up the train while it is running), the train may say "We're off the track!"

The loading car 203 has a well 277 that is cooperatively structured to receive a block 211. The well 277 is formed in a plastic replica of coal. As shown, the block 211 includes four structural patterns 213(a)-213(d) at four side border regions. The image of a big letter Z, a little letter z, and a zebra are at the central region of the block face that is facing up. In this embodiment, the four structural patterns 213(a)-213(d) include slots and solid portions. Any of the above-described blocks-or solid objects can be used with the train (or other toy vehicle). Like many of the above described blocks and wells, the well 277 can be cooperatively structured with a block that is received in it.

The loading car 203 can be a housing and can hold the block 211 in any orientation. In this electronic toy train 200, there are a number of different ways to play with the blocks and the electronic toy train 200. In one play mode, the block 211 can be inserted with a letter side up and the train 200 teaches the letter name, phonetic sound, and a word that starts with the letter. For example, referring to FIG. 9(a), the letter "Z" faces up and pressing the block 211 down in the loading car 203 causes the toy train 200 to say "Z, Z says Z, Z is for zebra." Such audio can be played when the train 200 is moving or not moving. In another play mode, different pictures on the block 211 may face up and when the block 211 is pressed down, songs can be played by the train 200. For example, the images of 1) the letters ABC with musical notes, 2) a whistle, 3) a train, and 4) a suitcase, can be on block faces and can face up when the blocks are in the loading car 203. When such blocks are pressed down in the loading car 203, the train 200 may play songs such as the "ABC song", "Down by the Station", "I've Been Working On The Railroad", and an instrumental song, whether or not the toy train 200 is running. In some embodiments, if the train 200 does not have a block in the coal car, the toy train 200 can race around a train track (not shown) and play fun train sounds.

Figure 9B:
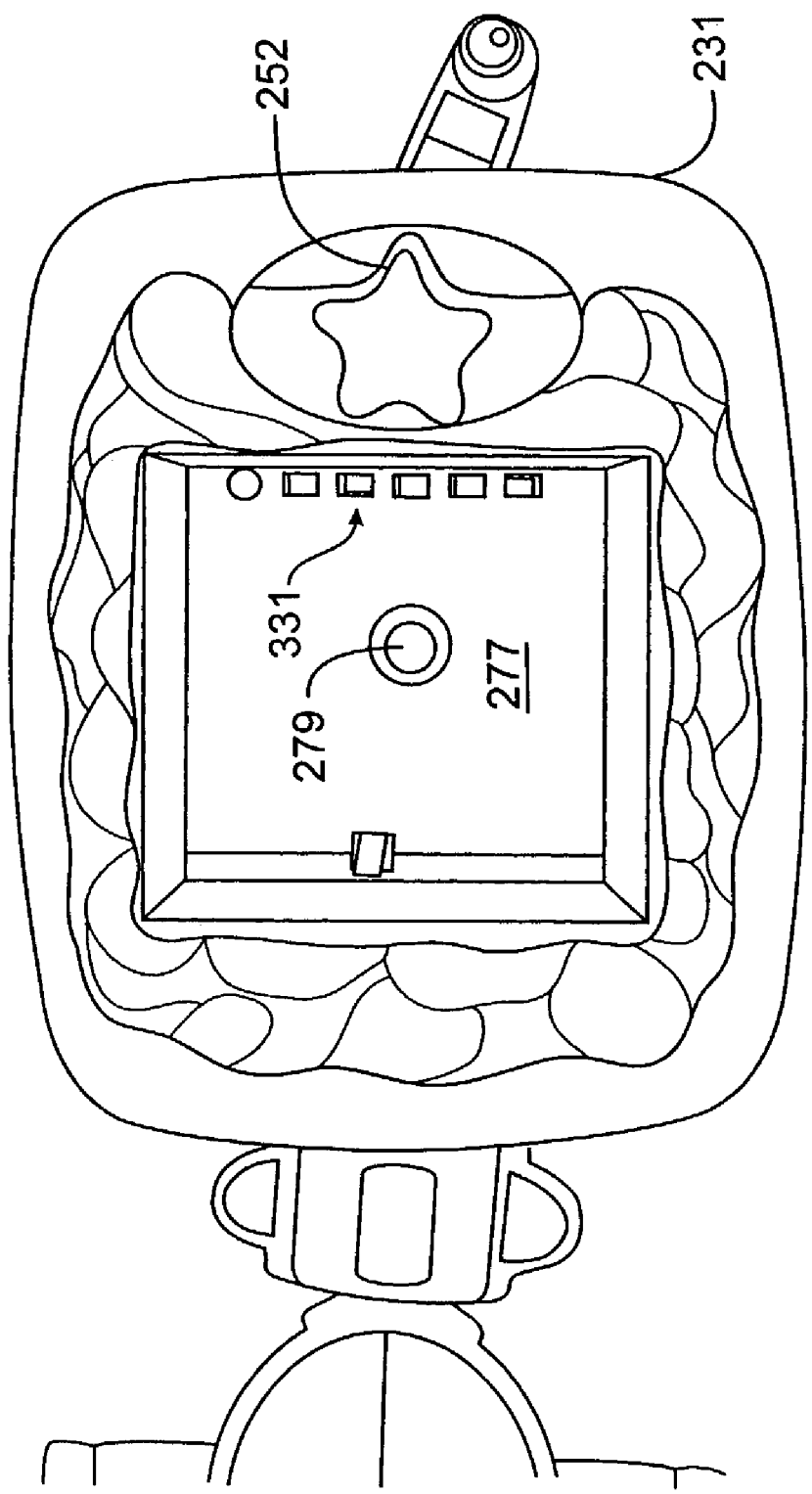
FIG. 9(b) shows a well with a detection device in a loading car.

Referring to FIG. 9(b), to remove the block 211, a star shaped eject button 252 in the loading car 231 can be depressed to cause an ejector 279 to eject the block 211 from the well 277 (ejector 279 can also function as a pressure switch). There are five of detectors 331 at the bottom of the well 277 that form at least part of a detection device. The five detectors 331 can form a detection device that can interface with the structural pattern on a block that is within the well 277.

Figure 9C:
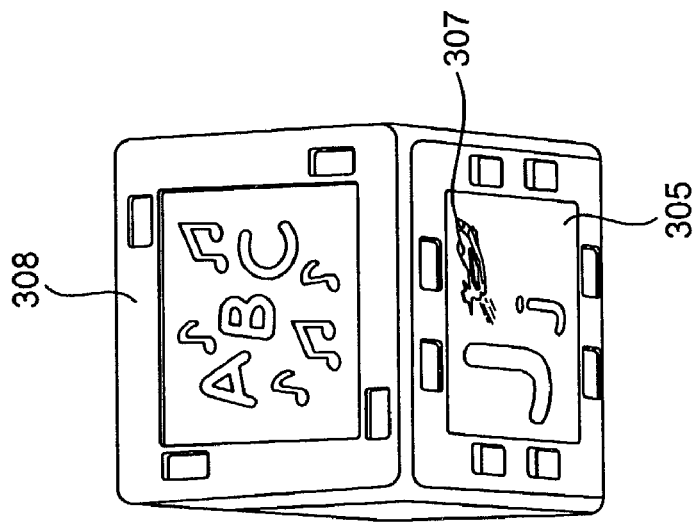
FIG. 9(c) shows a plurality of blocks according to an embodiment of the invention.
Figure 9C:
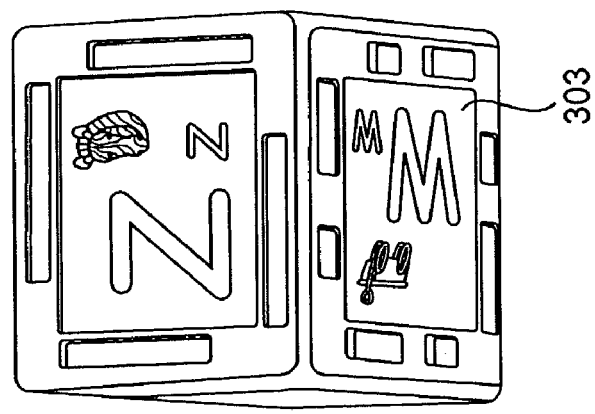
Figure 9C:
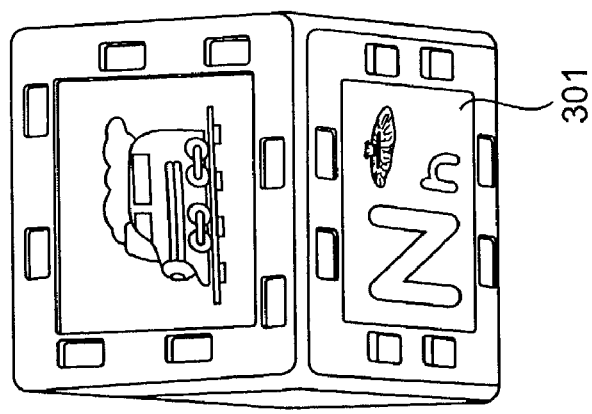

The set of blocks that is used in the toy vehicle apparatus may comprise indicia such as letters, numbers, or shapes printed on the faces of the blocks in the set. The vehicle apparatus may include a memory device that is preprogrammed with songs about the indicia. When a block with a particular indicium is placed in the toy vehicle in the toy vehicle apparatus, the toy vehicle may play a song that is appropriate for or related to that indicium. The indicia on the blocks may further match the indicia on the track on which the toy vehicle will move. For example, FIG. 9(c) shows additional examples of blocks 301, 303, 305 in a set of blocks comprising the indicia A-Z. Block 305 has a first face 308 that has four first structural patterns at four side border regions, and a second face 307 that has four second structural patterns at four side border regions. When block face 308 faces upward in the loading car in FIG. 9(b), the train 200 plays the ABC song. When the block face 307 faces up, the train 200 plays music and says "J says juh". The matching letters A-Z may also be on the track that the train 200 travels on.

Figure 9D:
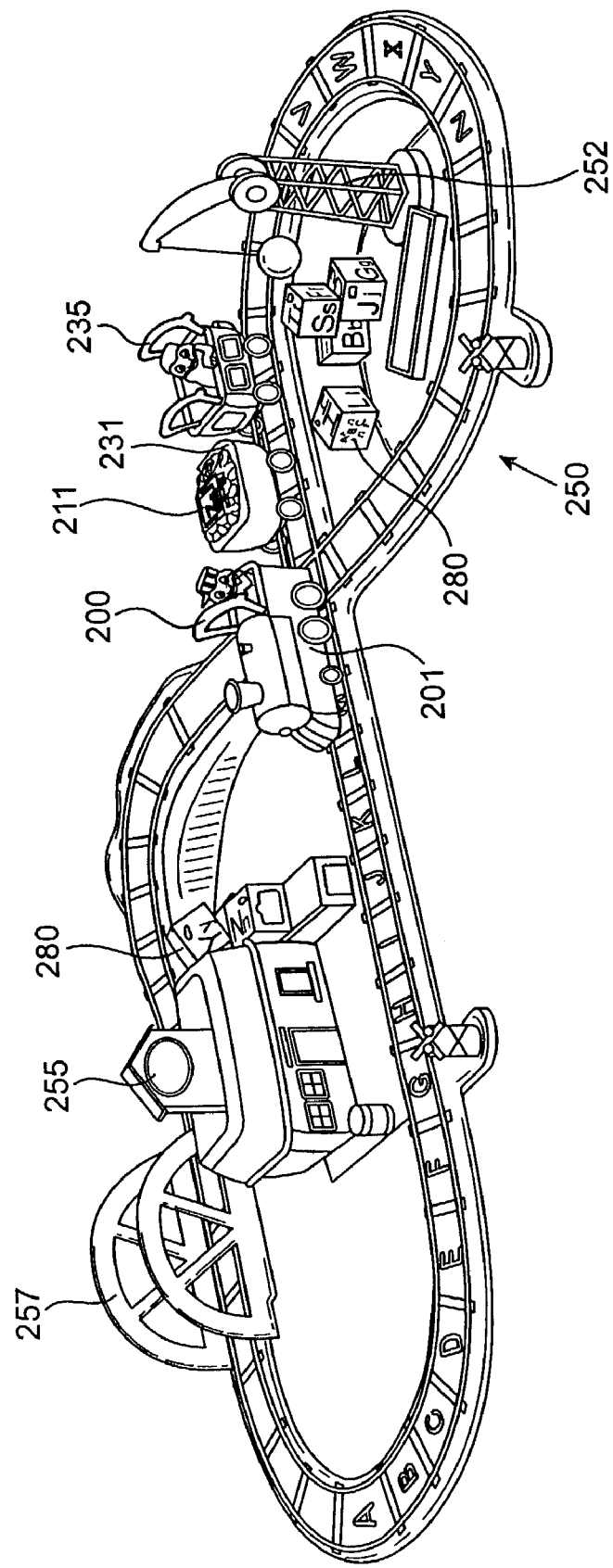
FIG. 9(d) shows a train set according to an embodiment of the invention.

FIG. 9(d) shows a train set according to an embodiment of the invention. The train set includes a train 200 with an engine 201, a loading car 231 and a caboose 235. A block is in the loading car 231. The train 200 rides on a train track 250. Various other figures including a train station 255, and a wrecking ball 252 and in the train set. As shown, children can use the blocks with the wrecking ball 252 and/or can slide the blocks 280 down a ramp that is connected to the train station 255.

Figure 9E:
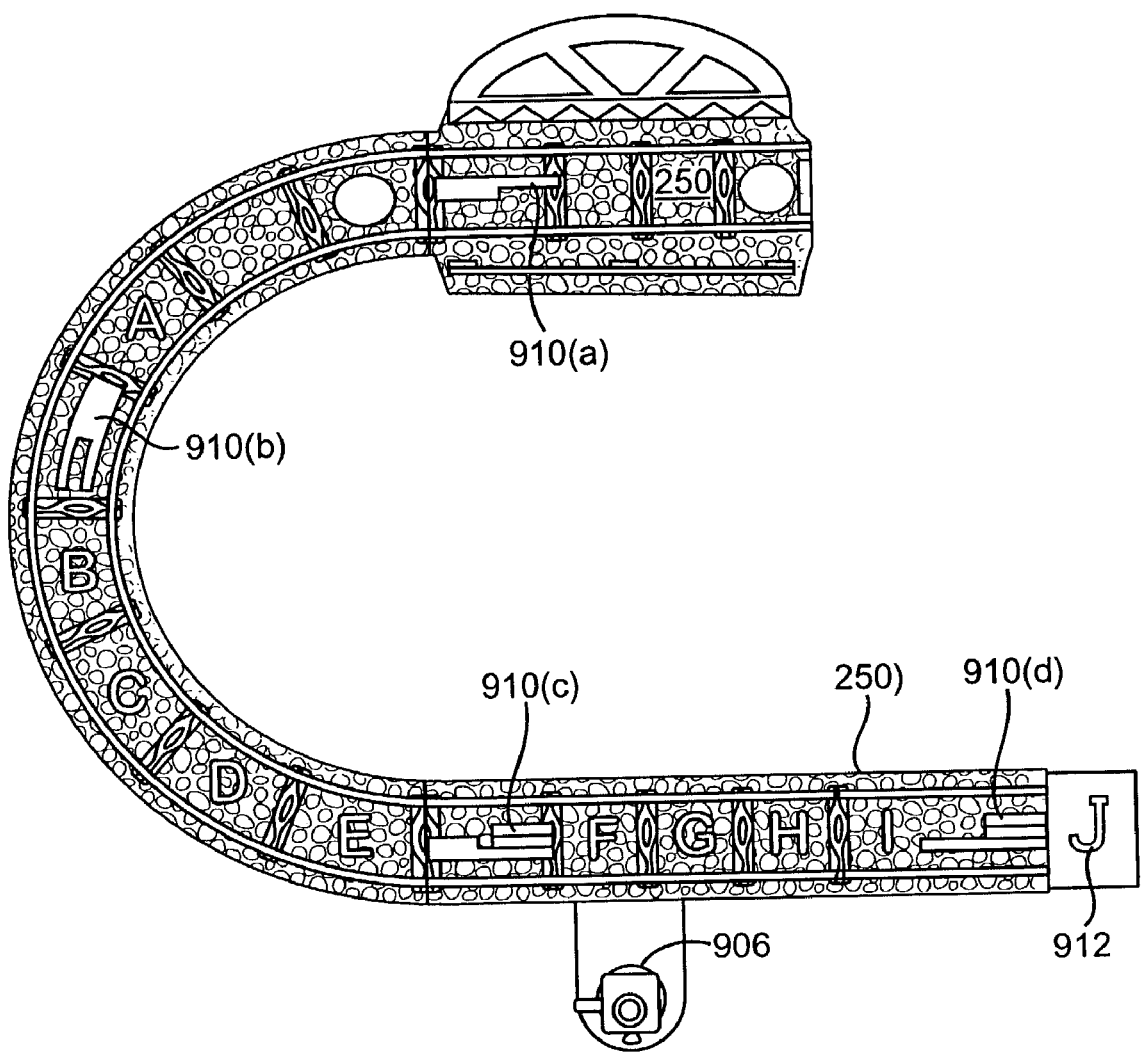
FIG. 9(e) shows a track according to an embodiment of the invention.

FIG. 9(e) shows a plan view of a section of the train track 250. The train track 250 includes a number of raised letters 912. The raised letters 912 also include the letter "J" which forms a male coupling point for two adjacent pieces of track. As shown, the raised letters 912 include the letters of the alphabet and the letters of the alphabet can proceed in sequence on a full track. This not only reinforces the alphabet in a child's mind, but it also makes the train track 250 easier to put together as parent or child can simply put the track together using the sequence of the alphabet as a guide.

Referring to FIG. 9(e), some embodiments of the invention are directed to a "smart train" whereby the train cars and/or engine know where they are on the track 250. The operation of the train can change in accordance with its location on the track 250. In order to accomplish this result, the track 250 also includes a number of structural patterns 910(a)-910(d). These structural patterns 910(a)-910(d) are raised with respect to other portions of the track 250. Some structural patterns 910(a), 910(b), 910(d) are fixed structural patterns that include protrusions that are formed from molded plastic. Other structural patterns can be changed by the child. For example, in FIG. 9(c), the structural pattern 910(c) can be changed using a switching station 906. A child can rotate the switching station 906 and this causes a portion of the structural pattern 910(c) to move up or down, thus changing the structural pattern 910(c). This changing structural pattern 910(c) can engage a plurality of track-reading switches to inform a train, for example, that it should stop or go.

Figure 9F:
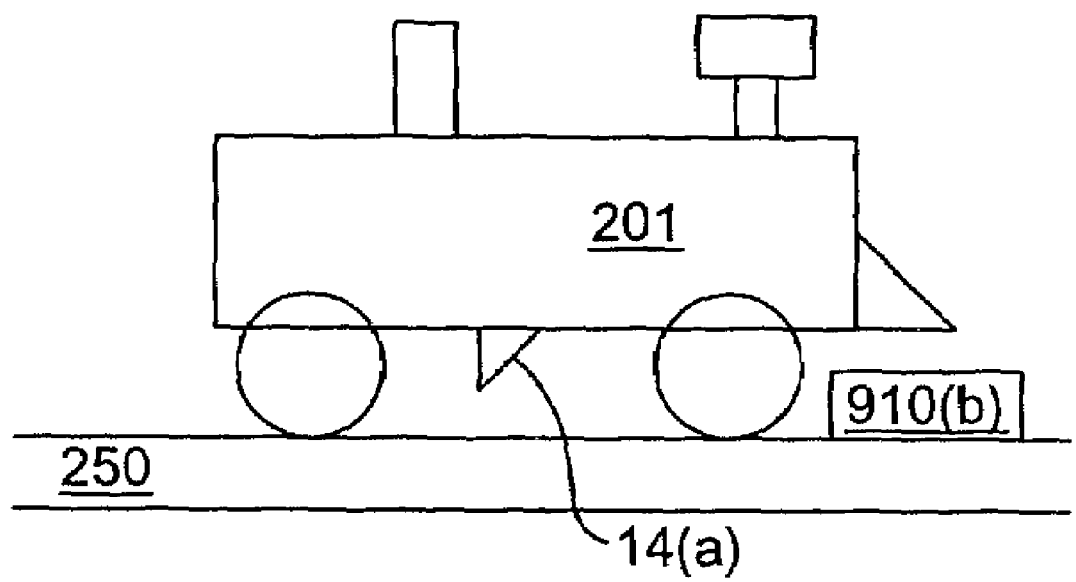
FIG. 9(f) shows a schematic drawing of a side view of track-reading switches on the underside of a train engine.
Figure 9G:
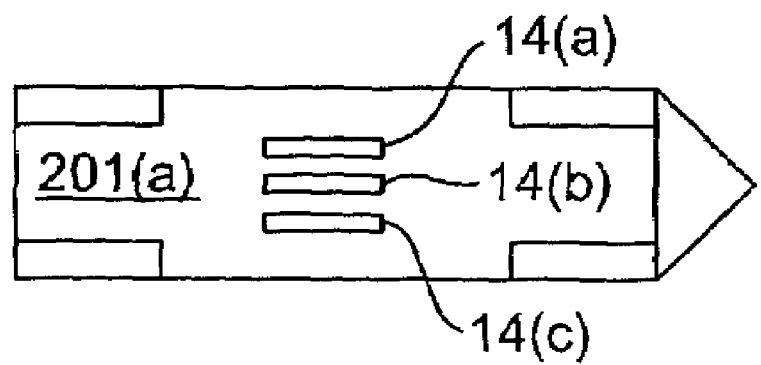
FIG. 9(g) shows a schematic drawing of a bottom view of track-reading switches on the underside of a train engine.

FIGS. 9(f) and 9(g) show schematic illustrations of a train engine 201 and track-reading switches 14(a)-14(c) at an underside 201(a) of the train engine 12. The structural patterns 910(a)-910(d) shown in FIG. 9(e) can selectively activate track-reading switches 14(a)-14(c) on the underside 201(a) of a train car or an engine 201. For example, the underside of the engine shown in FIGS. 9(f) and 9(g) can have three track-reading switches including a middle switch 14(b), and two outer switches 14(a), 14(c) (any number of track-reading switches can be present in embodiments of the invention). As the engine 201 (not shown in FIG. 9(e)) travels clockwise from letter B to letter A, the two outer switches on the underside of the engine 201 can engage structural pattern 910(b). The protrusions forming structural pattern 910(b) push the two outer track-reading switches 14(a), 14(c) upward while the middle switch 14(b) remains down, thus informing a processor in the engine 201 that it is between the letters A and B on the track. As shown in FIG. 9(f), the angled front surface of the track-reading switch 14(a) is gradually pushed upwardly in response to contact with the protrusions forming structural pattern 910(b). As the engine 200 continues in a clockwise direction, it encounters another structural pattern 910(a), which A activates all three switches 14(a)-14(c) on the underside of the engine 201. The engine 201 is then informed that it has reached the point on the track 250 where the structural pattern 910(a) is located.

The structural patterns on the track can have any suitable form. In FIG. 9(e), the structural patterns are in the form of elongated protrusions that are oriented in the direction of the track. The structural patterns on the track can take different forms in other embodiments.

The operation of the train can change in any way once it knows its location on the track 250. In some embodiments, a song that is being played by the train can start or stop at a certain point on the track by knowing where it is on the track. For example, referring to FIG. 9(e), the ABC song can start when the train 200 is at the station 255 and can end when it makes four trips around the track 250. Thus, songs can be played at a predetermined point on the track, or predetermined audio outputs can be played when the train is at predetermined locations on the track. In another example, a certain structural pattern may inform a processor inside of the train that a hill is coming soon and that more power should be supplied to the motor in the engine so that the same train speed is maintained. In yet another example, by knowing its location on the track 250, the train 200 can announce to the child that it is about to go up a hill, it just went down a hill, or that it is about to enter a train station (or other play landmark). In yet another example, the train 200 may go faster or slower on different segments of the track. In still another example, the track 250 may have indicia formed or printed on it. When a block with a particular indicium is in the train 200 and is displayed to the child, the train 200 knows where it is on the track 250 and can automatically stop at the same indicium that is on the track 250. By knowing where it is on the track 250, the train 200 can change its operation and is more interactive and fun than other toy trains.

In other embodiments, the train may also stop or start if it encounters a particular structural pattern on the track. For example, as shown in FIG. 9(e), a switching station 906 can be turned clockwise or counterclockwise by a child to raise or lower a movable element 910(c)-1 in the structural pattern 910(c). Thus, the structure in the structural pattern 910(c) can change as desired by the child and specific track-reading switches underneath train engine 201 (or train car) can be activated to inform the train engine 200 to stop or start.

Figure 10:
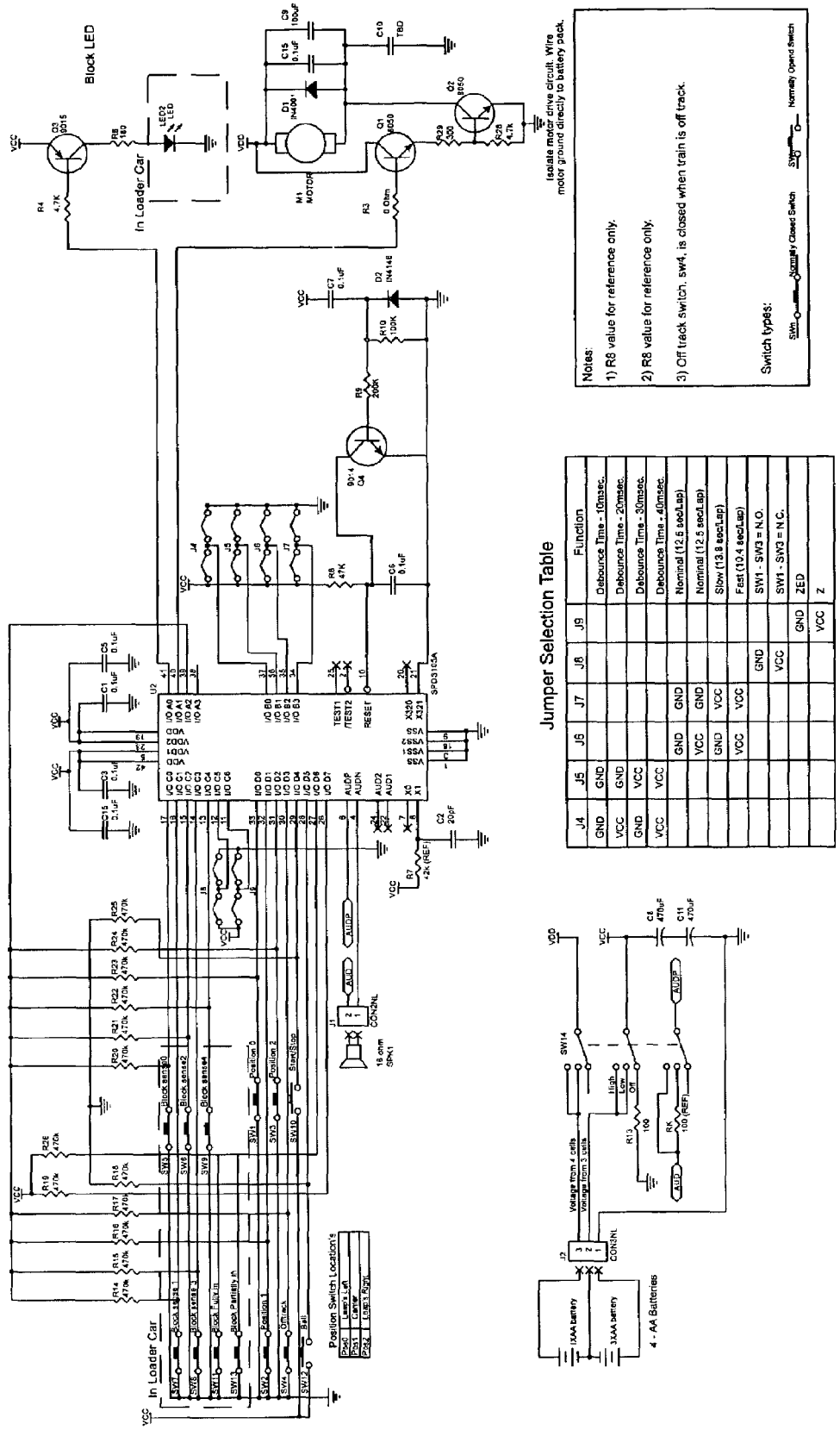
FIG. 10 shows a circuit diagram that could be used with the train set shown in FIG. 9(d).

The general electronic configuration in FIG. 6 can be used in the train embodiments. FIG. 10 shows a more specific circuit diagram for the train 200 shown in FIGS. 9(a)-9(e). Other circuits could be used with the toy train and determined by those of ordinary skill in the art.

The toy vehicle apparatus embodiments have a number of specific advantages. First, the vehicle embodiments promote language development. For example, in vehicle apparatus embodiments of the invention, children are introduced to the names and phonemes of each letter of the alphabet. Rhyming is also taught. Rhyming helps children recognize letter sounds and how sounds make words. Second, embodiments of the invention encourage exploration and creativity. Children are encouraged to explore the alphabet as they choose and place letter blocks into the train's loading car. Train play and character interaction stimulates the imagination and encourages creative play. Third, cognitive skills are developed. Following simple directions helps children develop cognitive skills. Fourth, perceptual skills are developed. Bright colors and train motion stimulate visual perception. Fifth, motor skills are developed. Operating the train, turning stop signs, and manipulating letter blocks develops gross motor skills.

Any of the toys according to embodiments of the present invention can optionally include a slot (not shown) for a transferable information storage medium (not shown) that is operatively coupled to the processor and memory unit. The slot can be cooperatively structured to receive the transferable storage medium in a removable manner. Any suitable transferable storage medium can be employed in the toy including, but not limited to, a data cartridge (e.g., a flash memory cartridge), a disk, a tape or a memory stick. The transferable information storage medium can be used to provide code for new operating modes or new audio data (e.g., new songs) to the toy. The transferable information storage medium may be purchased at a store, or may be created at the user's site by downloading new content from a personal computer or from the Internet. The transferable information storage medium may form part of a kit, along with a block or a set of blocks (e.g., a set of blocks with the letters A-Z printed on the faces of the blocks).

The toys can also form part of a system that provides the them with new content. For example, in some embodiments, a linker device can be used to transfer data (e.g., new audio data or code for new operating modes) between the toy and a computer (e.g., an Internet-enabled personal computer or server computer). The linker device can be any suitable linker device known to one skilled in the art, such as a wireless transceiver (e.g., a radio frequency [RF] transceiver or an infra-red [IR] transceiver) or a data port (e.g., a Universal Serial Bus [USB] data port). The data port enables a user to transfer data to, and from, the interactive learning apparatus through a physical connection (e.g., a data cable) among the toy and a client PC or the Internet. The inclusion of a linker device in the toy results in an Internet-enabled toy. Details regarding such Internet-enabled embodiments can be found in U.S. patent application No. 09/632,424, filed on Aug. 4, 2000. This U.S. Patent Application is herein incorporated by reference in its entirety for all purposes.

All U.S. Provisional and Non-Provisional Patent Applications, and U.S. Patents mentioned above are herein incorporated by reference in their entirety for all purposes.

The terms and expressions which have been employed herein are used as terms of description and not of limitation, and there is no intention in the use of such terms and expressions of excluding equivalents of the features shown and described, or portions thereof, it being recognized that various modifications are possible within the scope of invention the claimed. Moreover, one or more features of embodiments of the invention may be combined any one of more features of other embodiments of the invention without departing from the spirit and scope of the invention.

What is claimed is:

1. An interactive book comprising:
   (a) a housing in the form of a cover or page of the interactive book;
   (b) a plurality of pages;
   (c) a set of switches associated with the plurality of pages located in a binding of the book;
   (d) a processor in the housing;
   (e) a receiving region on the housing;
   (f) a detection device in the receiving region;
   (g) a solid object to be received in the receiving region and to be detected by the detection device including a first face defined by one or more continuous, uninterrupted edges and having a first structural pattern, and a second face defined by one or more continuous, uninterrupted edges and having a second structural pattern, the first structural pattern being different than the second structural pattern, wherein a different number or combination of detectors in the plurality of detectors is activated when the first structural pattern interfaces with the detection device than when the second structural pattern interfaces with the detection device; and
   (h) an output device operatively coupled to the processor;
   wherein the set of switches are operatively coupled to the processor to indicate which of the plurality of pages the book has been opened to, and wherein the processor causes an audio signal to be generated by the output device based upon which page the book is currently opened to and which face of the solid object is interfacing with the detection device.

2. The interactive book of claim 1 wherein images on the pages of the book are related to the images on the solid object.

3. The interactive book of claim 1 wherein the solid object is a block with six faces, each face having a structural pattern that interacts with the detection device.

4. The interactive book of claim 1 wherein the images on the pages of the book relate to images on the solid object, wherein the images on the solid object and the pages of the book comprise animals.

5. The interactive book of claim 1 wherein the output device is a speaker.

6. The interactive book of claim 1 further comprising a read button on the housing, wherein the interactive book automatically reads from a displayed page when the read button is depressed.

7. The interactive book of claim 1 further comprising a music button, wherein the interactive book automatically plays music associated with the displayed page when the music button is depressed.

8. An interactive book comprising:
   (a) a housing in the form of a cover or page of the interactive book;
   (b) a plurality of pages;
   (c) a set of switches associated with the plurality of pages;
   (d) a processor in the housing;
   (e) a receiving region on the housing;
   (f) a detection device in the receiving region;
   (g) a solid object to be received in the receiving region and to be detected by the detection device, wherein the solid object has six faces, each face having four structural patterns, each structural pattern on each face being at a side border region and being capable of interacting with the detection device, and each face having an image at a center region of the face; and
   (h) an output device operatively coupled to the processor.

* * * * *